(12) United States Patent  
Mattsson et al.

(10) Patent No.: US 9,087,209 B2  
(45) Date of Patent: Jul. 21, 2015

(54) DATABASE ACCESS CONTROL

(71) Applicant: Protegrity Corporation, George Town, Grand Cayman (KY)

(72) Inventors: Ulf Mattsson, Cos Cob, CT (US); Hans Meijer, Skelleftea (SE); Jan Boberg, Skelleftea (SE)

(73) Assignee: Protegrity Corporation, Grand Cayman (KY)

( * ) Notice: Subject to any disclaimer, the term of this patent is extended or adjusted under 35 U.S.C. 154(b) by 7 days.

(21) Appl. No.: 14/037,302

(22) Filed: Sep. 25, 2013

(65) Prior Publication Data

US 2014/0090085 A1 Mar. 27, 2014

Related U.S. Application Data

(60) Provisional application No. 61/706,043, filed on Sep. 26, 2012.

(51) Int. Cl.
*H04L 29/06* (2006.01)
*G06F 21/62* (2013.01)

(52) U.S. Cl.
CPC ........ *G06F 21/6218* (2013.01); *G06F 21/6227* (2013.01)

(58) Field of Classification Search
CPC .................... G06F 21/6218; G06F 21/6227
USPC ............................................. 726/28; 707/781
See application file for complete search history.

(56) References Cited

U.S. PATENT DOCUMENTS

| | | | |
|---|---|---|---|
| 5,495,533 A * | 2/1996 | Linehan et al. ............... 713/155 |
| 6,321,201 B1 * | 11/2001 | Dahl ............................... 705/51 |
| 6,327,595 B1 * | 12/2001 | Lyson et al. ......................... 1/1 |
| 6,366,915 B1 * | 4/2002 | Rubert et al. ................. 707/770 |
| 6,526,406 B1 * | 2/2003 | Suzuki et al. ........................ 1/1 |
| 6,789,195 B1 * | 9/2004 | Prihoda et al. ............... 713/182 |
| 8,272,051 B1 * | 9/2012 | Zhao et al. ...................... 726/22 |
| 2002/0063154 A1 * | 5/2002 | Hoyos et al. ............... 235/382.5 |
| 2002/0065956 A1 * | 5/2002 | Yagawa et al. ............... 709/330 |
| 2003/0037263 A1 * | 2/2003 | Kamat et al. ................. 713/202 |
| 2003/0041065 A1 * | 2/2003 | Lucovsky et al. ............ 707/10 |
| 2003/0050911 A1 * | 3/2003 | Lucovsky et al. .............. 707/1 |
| 2004/0044655 A1 * | 3/2004 | Cotner et al. ..................... 707/3 |
| 2004/0122792 A1 * | 6/2004 | Salazar ............................ 707/1 |
| 2004/0162825 A1 * | 8/2004 | Bhaghavan et al. .............. 707/5 |
| 2005/0004924 A1 * | 1/2005 | Baldwin ...................... 707/100 |
| 2005/0114661 A1 * | 5/2005 | Cheng et al. .................. 713/167 |
| 2005/0120233 A1 * | 6/2005 | Halcrow et al. ............... 713/193 |
| 2006/0059567 A1 * | 3/2006 | Bird et al. ..................... 726/27 |
| 2006/0167850 A1 * | 7/2006 | Fish et al. ........................ 707/3 |
| 2006/0218190 A1 * | 9/2006 | Frost et al. ................. 707/104.1 |
| 2007/0168678 A1 * | 7/2007 | Meenakshisundaram .... 713/189 |
| 2007/0220004 A1 * | 9/2007 | Fifield et al. ..................... 707/9 |
| 2008/0022136 A1 * | 1/2008 | Mattsson et al. ............. 713/194 |

(Continued)

Primary Examiner — David García Cervetti
(74) Attorney, Agent, or Firm — Fenwick & West LLP

(57) ABSTRACT

A method for database access control includes receiving an access request from a requesting user, the access request identifying one or more data entries stored in a base table storing a plurality a data entries each associated with a data category. The identified one or more data entries from the base table are retrieved and a security table including one or more data categories to which the requesting user is authorized to access is generated based on an identity of the requesting user. The data entries associated with a data category included in the security table are outputted as a result table.

17 Claims, 4 Drawing Sheets

(56) References Cited

U.S. PATENT DOCUMENTS

| | | | |
|---|---|---|---|
| 2008/0033960 A1* | 2/2008 | Banks et al. | 707/9 |
| 2008/0133935 A1* | 6/2008 | Elovici et al. | 713/193 |
| 2008/0235231 A1* | 9/2008 | Gass et al. | 707/9 |
| 2009/0019103 A1* | 1/2009 | Tommaney et al. | 709/201 |
| 2009/0094193 A1* | 4/2009 | King et al. | 707/2 |
| 2009/0198697 A1* | 8/2009 | Bilger et al. | 707/9 |
| 2009/0282045 A1* | 11/2009 | Hsieh et al. | 707/9 |
| 2010/0017876 A1* | 1/2010 | Chusing et al. | 726/21 |
| 2010/0030737 A1* | 2/2010 | Scheuber-Heinz et al. | 707/3 |
| 2010/0241595 A1* | 9/2010 | Felsher | 705/400 |
| 2010/0262625 A1* | 10/2010 | Pittenger | 707/783 |
| 2011/0307695 A1* | 12/2011 | Slater | 713/163 |
| 2012/0072992 A1* | 3/2012 | Arasaratnam et al. | 726/26 |
| 2012/0131351 A1* | 5/2012 | Balinsky et al. | 713/189 |
| 2012/0216240 A1* | 8/2012 | Gottumukkala et al. | 726/1 |
| 2012/0310918 A1* | 12/2012 | Johri et al. | 707/714 |
| 2012/0330923 A1* | 12/2012 | Modi | 707/714 |
| 2013/0031366 A1* | 1/2013 | Simske et al. | 713/168 |
| 2013/0174215 A1* | 7/2013 | Mattsson | 726/1 |
| 2013/0179684 A1* | 7/2013 | Furukawa | 713/165 |
| 2013/0191650 A1* | 7/2013 | Balakrishnan et al. | 713/190 |
| 2013/0268750 A1* | 10/2013 | Furukawa | 713/153 |
| 2013/0297654 A1* | 11/2013 | Khimich et al. | 707/783 |
| 2013/0325841 A1* | 12/2013 | Ahmed et al. | 707/713 |
| 2014/0052749 A1* | 2/2014 | Rissanen | 707/759 |
| 2014/0052999 A1* | 2/2014 | Aissi et al. | 713/189 |
| 2014/0325217 A1* | 10/2014 | Mori et al. | 713/165 |

* cited by examiner

DATABASE ACCESS CONTROL

CROSS REFERENCE TO RELATED APPLICATIONS

The application claims the benefit of Provisional Application No. 61/706,043 filed on Sep. 26, 2012, which is incorporated herein by reference.

FIELD OF ART

This application relates to the field of database security, and more specifically to a system and method for providing database access control based on a categorization of data stored in a database system.

BACKGROUND

Most business enterprises and organizations store large volumes of data (such as business records, financial records, personnel records, and the like) that is of significant commercial importance. Such data is frequently organized and stored in a structured manner in databases within storage servers. These databases are integral to the existence and functioning of such commercial enterprises and organizations. Accordingly, the protection of data stored in these databases is therefore of great importance.

SUMMARY

An approach to protecting data stored in databases used by enterprises and organizations includes implementing systems and procedures that ensure safe and regulated access to such data and by preventing data retrieval attempts from unauthorized sources.

In one embodiment, a method for providing database access control includes receiving an access request from a requesting user, the access request identifying requested data and including user credentials identifying the requesting. The access request is parsed into the user credentials and the request for data. An authorization table is queried with the user credentials, where the authorization table stores one or more data categories, each associated with one or more users. In response to querying the authorization table, a security table is retrieved that identifies a subset of the one or more data categories to which the requesting user has access.

The method queries a base table based on the request for data and the retrieved security table. The base table includes a plurality of data entries, each mapped to at least one data category. In response, a plurality of candidate data entries identified in the data request and mapped to categories identified in the security table is retrieved. A result set of data entries is generated and can be sent to the requesting user.

The features and advantages described in this summary and the following detailed description are not all-inclusive. Many additional features and advantages will be apparent to one of ordinary skill in the art in view of the drawings, specification, and claims hereof.

The figures (Figs.) depict embodiments for purposes of illustration only. One skilled in the art will readily recognize from the following description that alternative embodiments of the structures and methods illustrated herein can be employed without departing from the principles of the invention described herein.

DETAILED DESCRIPTION

Reference will now be made in detail to several embodiments, examples of which are illustrated in the accompanying figures. It is noted that wherever practicable, similar or like reference numbers can be used in the figures and can indicate similar or like functionality. The figures depict embodiments of the disclosed system (or method) for purposes of illustration only. One skilled in the art will readily recognize from the following description that alternative embodiments of the structures and methods illustrated herein can be employed without departing from the principles described herein.

Database Access System Overview

Figure 1:
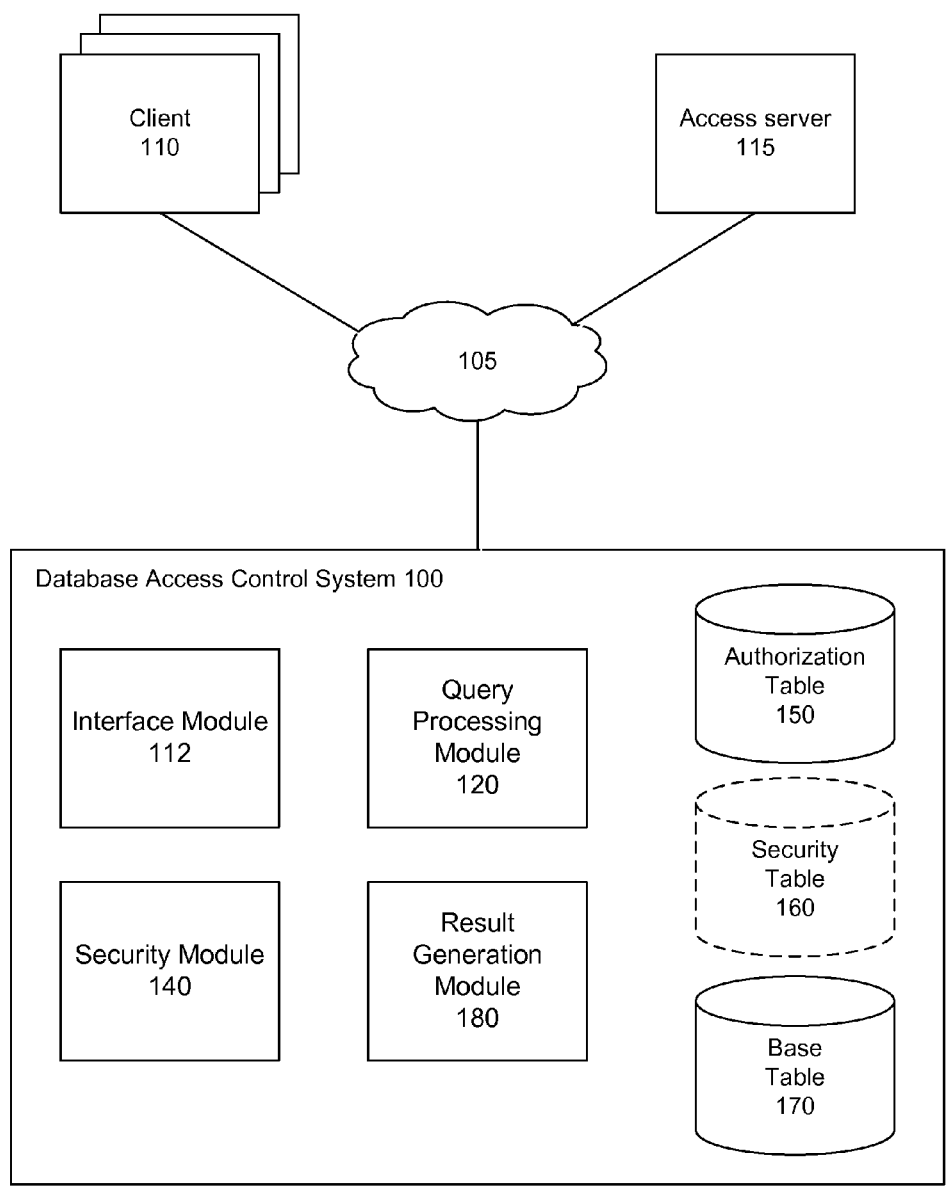
FIG. 1 is a system environment diagram for a database access control system, according to one embodiment.

FIG. 1 is a system environment diagram for a database access system, according to one embodiment. The system environment of FIG. 1 includes a database access control system 100 ("database access system" hereinafter), one or more clients 110, and an access server 115, communicatively coupled through a connecting network 105. A user or other entity can use a client 110 to access the database access system 100 via the network 105. Other embodiments of the system environment can contain different and/or additional components than those shown by FIG. 1.

A client 110 is a computing device capable of processing data as well as transmitting data to and receiving data from the other modules of FIG. 1 via the network 105. For example, the client 110 can be a desktop computer, laptop computer, smart phone, tablet computing device, server, payment terminal, or any other device having computing and data communication capabilities. Each client 110 includes one or more processors, memory, storage, and networking components. Each client 110 is coupled to the network 105 and can interact with other modules coupled to the network 105 using software such as a web browser or other application with communication functionality. Such software can include an interface for communicating with the other modules via the network 105. In some embodiments of the environment of FIG. 1, there can be any number of the clients 110, access servers 115, and database access systems 100 connected to the network 105 and communicating with one or more other modules.

The database access system 100 can be a computer, such as a server, a personal computer, and the like; a data center; a data storage device; or any other device. The client device 110 and/or the database access system 100 can be any device with a processor configured to execute instructions stored on a non-transitory computer-readable storage medium. The instructions stored on the non-transitory computer-readable storage medium include instructions configured to enable the client device 110 and/or the database access system 100 to perform the operations described herein. The client device 110 can include a monitor or display configured to display the result table 190 to the requesting user.

The network 105 connecting the various modules is typically the Internet, but can be any network, including but not limited to a local area network (LAN), metropolitan area network (MAN), wide area network (WAN), cellular network, wired network, wireless network, private network, virtual private network (VPN), direct communication line, and the like. The network 105 can also be a combination of multiple different networks.

A client 110 is configured to request access to data stored in the database access system 100. The database access system 100 is configured to receive a request for data from a client 110, determine the access rights assigned to a user of the client device 110, and based on the user's access rights, to provide result data back to the client 110. The database access system 100 includes an interface module 112, a query processing module 120, a security module 140, an authorization table 150, a security table 160, a base table 170, and a result generation module 180.

The interface module 112 provides an interface that allows a client 110 to interact with one or more of the components of the database access system 100, and is one means for performing this function. In addition, the interface module 112 provides a communicative interface between components of the database access system 100. The interface module 112 receives an access request from a requesting user (e.g., an individual using the client device 100 to communicate with database access system 100) for data stored in the database access control system 100. In one embodiment, the access request is received via a client device 110 configured to communicatively couple to and interact with the database access system 100. The interface module 112 routes the received access request to the query processing module 120.

The query processing module 120 receives the access request from the interface module 112 and parses (e.g., segments or separates) the access request into user credentials (e.g., information associated with the identity of the user, such as a password or other user credentials, an organization or commercial entity to which the requesting user belongs, a security level of the requesting user, and the like), and a request for data identifying data stored within the base table 170. The query processing module 120 provides the parsed user credentials to the security module 140, and queries base table 170 to retrieve data entries identified within the request for data.

The security module 140 receives the user credentials from the query processing module 120 and queries an authorization table 150 based on the received user credentials. The authorization table 150 maps user credentials, user identities, data request contexts, and the like (simply "credentials" hereinafter) to data categories. The data categories mapped to a user's credentials are data categories that the user is authorized to access. The authorization table 150 can be populated according to an external security policy dictating which users can access each category of data and (optionally) the context in which the data portions can be accessed. The security module 140 retrieves, from the authorization table 150, the data categories to which the requesting user is permitted access (e.g., data categories associated with associated with the user's credentials). The security module 140 generates a security table 160 based on the retrieved data categories associated with the user's credentials. In alternative embodiments, the security module 140 retrieves the security table 160 directly from the authorization table 150.

In alternative embodiments, the security module 140 determines the data categories that a requesting user can access using one or more access requirements. Each access requirement is associated with one or more data categories, and specifies one or more characteristics associated with the requesting user or the context of the request that must be satisfied prior to allowing the requesting user to access the associated one or more data categories. Accordingly, the security module 140 can determine the data categories a requesting user can access by evaluating the access requirements to determine which access requirements the requesting user satisfies. For example, the security module can implement a set of access requirements configured to allow access to certain data categories only between certain times of day. Similarly, the security module can implement a second set of access requirements that limit access to certain data categories based on the security credentials of the requesting user, or based on a software configuration of the client device of the requesting user. In these examples, when a user requests access to data, the security module 140 can identify categories of data that the user can access based on the time of the request and based on the user's credentials or client device software configuration.

Stated differently, in some embodiments, categories assigned to users in the authorization table are time-dependent or vary with time (e.g., time of day or week). For example, during business hours (e.g., between 9 AM and 5 PM) over week days, a certain user (e.g., user M, an employee of an organization or commercial enterprise) is assigned category X7 in the authorization table 150, allowing him access to data entries Data1 and Data3 in the base table 170 (as explained with reference to FIG. 2 below). However, outside of work hours, the certain user is assigned category 9T which allows him access to Data2 and Data4 instead. Beneficially, organizations can conveniently restrict or allow access to different data entries based on a time of day or week, simply by modifying the relationship or mapping, in the authorization table 150, between various users and data categories.

The authorization table 150 can further include data access levels indicating a magnitude of data access to a data category that a user is granted. In some embodiments, a data access level signifies a nature of access rights (e.g., no access, read/view only, read-write, delete) to the data entries in a particular data category to which a user has access. For example, with reference to FIG. 2 below, category X7 may provide "view only" access to the corresponding data entries (e.g., Data1 and Data3) whereas category 9T may provide read-write access to the associated data entries (e.g., Data2 and Data4).

In some embodiments, a data access level associated with a particular data category signifies fields or properties of the specific data entries (mapped to the particular data category in the base table) provided to a user authorized to access the particular data category. For example, with reference to FIG. 2 below, if data entries correspond to records of individual employees of an organization, a first user associated with data category X7 may be allowed to access to the properties or fields corresponding to names, addresses, and ages of the employees associated with data entries Data1 and Data3 in the base table 170, but not to the properties or fields corresponding to social security numbers, phone numbers, and dates of birth for these data entries. On the other hand, a second user associated with data category IQ may be allowed to access to the all of the properties or fields corresponding to name, address, age, social security number, phone number, and date of birth for the employee associated with data entry Data5. Stated differently, in some embodiments, the data access level specifies a set of properties of the specific data entries to which the corresponding user has access based on the particular data category.

In some embodiments, a data access level specified by a particular category signifies a nature of encryption of applied to specific data entries mapped to the particular category, thereby providing different levels of security and data protection to different data entries. In some embodiments, the base table comprises an encrypted representation (e.g., via tokenization or an alternative form of encryption) of the data entries and the data categories, and accessing the base table comprises decrypting one or more of the encrypted data entries to access the plurality of data entries and corresponding data categories.

In some embodiments, the one or more data categories stored in the authorization table correspond to business entities, organizational groups, class years, social circles, data types, data classes, security levels, or any combination thereof.

It should be noted that some data categories can be associated with multiple access requirements that must each be satisfied before the data categories can be accessed by a requesting user. In these and other embodiments, the security module 140 outputs one or more data categories to which the requesting user has access, for instance in the form of the security table 160.

The base table 170 includes a table of data entries, each data entry mapped to at least one data category. The base table 170 receives a query from the query processing module 120 to retrieve data entries identified by the data request, and outputs the identified data. In some embodiments, the query processing module accesses the security table 160, and queries the base table 170 for the data identified by the data request that is associated with at least one data category identified by the security table 160. In such embodiments, the data request can identify data categories associated with the requested data.

In some embodiments, the security module 140 queries the base table 170 with the data identified in the data request and with the data categories identified by the security table 160. In such embodiments, the base table 170 outputs only the data entries that are both identified by the data request and that are associated with at least one data category identified by the security table 160. Such embodiments can reduce the time and resources required to retrieve large amounts of data from a base table 170 by limiting the retrieved data entries to only those to which the requesting user has access.

In yet other embodiments, the query processing module 120 queries the base table 170 with the data identified by the data request, and the base table 170 outputs the data entries identified by the data request (along with the data categories associated with these data entries). In such embodiments, the data entries and associated data categories output by the base table are joined with the security table 160 at a join module (not shown in FIG. 1). The join module performs a join operation on the data entries received from the base table (and the associated data categories) and the security table, and outputs the data entries that are associated with data categories identified by the security table. For instance, the join module can eliminate the data entries from the base table that are not associated with at least one of the data categories identified in the security table, and outputs the remaining data entries.

A pseudocode implementation of the security module and a join operation performed in response to an access request is as follows:

---
Security Module:

Input user credentials
Extract the user identity from the user credentials
Get data categories from the authorization table and filter by user identity
FOR each data category
    Output one row in the security table
ENDFOR
Join Operation:

---

Input access request
FOR each row in the base table
    IF data row.category equals security table.category THEN
        Send row to Result Generation Module 180
    ELSE
        Skip the row
    ENDIF
ENDFOR

---

The result generation module 180 receives data entries and associated data categories from the base table 170, and displays the received data entries and data categories as a result table to the requesting user. The result generation module 180 can format the result table for display to the requesting user, for instance based on a requested result table preference received from the user, or based on properties of a client device 100 used by the user.

It should be noted that in some embodiments, certain components of the database access system 100 can be located external to the database access system 100. For example, the security module 140 and the authorization table 150 can be included in an external security system. Similarly, the result generation module 180 can be located in an external display system, or may be located within a client device 110 used by the requesting user. Furthermore, while the data entries and data categories are described herein as organized and mapped to each other in the form of a table (e.g., authorization table 150, security table 160, or base table 170), in practice, and as will be recognized by one of ordinary skill in the art, such data entries and data categories can be organized in various alternative formats and data structures without departing from the scope of the disclosure.

The database access control system 100 may be implemented using a single computer, or a network of computers, including cloud-based computer implementations. The operations of the database access control system 100 as described herein can be controlled through either hardware or through computer programs installed in computer storage and executed by the processors of such servers to perform the functions described herein. The database access control system 100 includes other hardware elements necessary for the operations described here, including network interfaces and protocols, input devices for data entry, and output devices for display, printing, or other presentations of data. The functions and operations of the database access control system 100 are sufficiently complex as to require implementation on a computer system, and cannot be performed in the human mind simply by mental steps.

Database Access Control Operation

Figure 2:
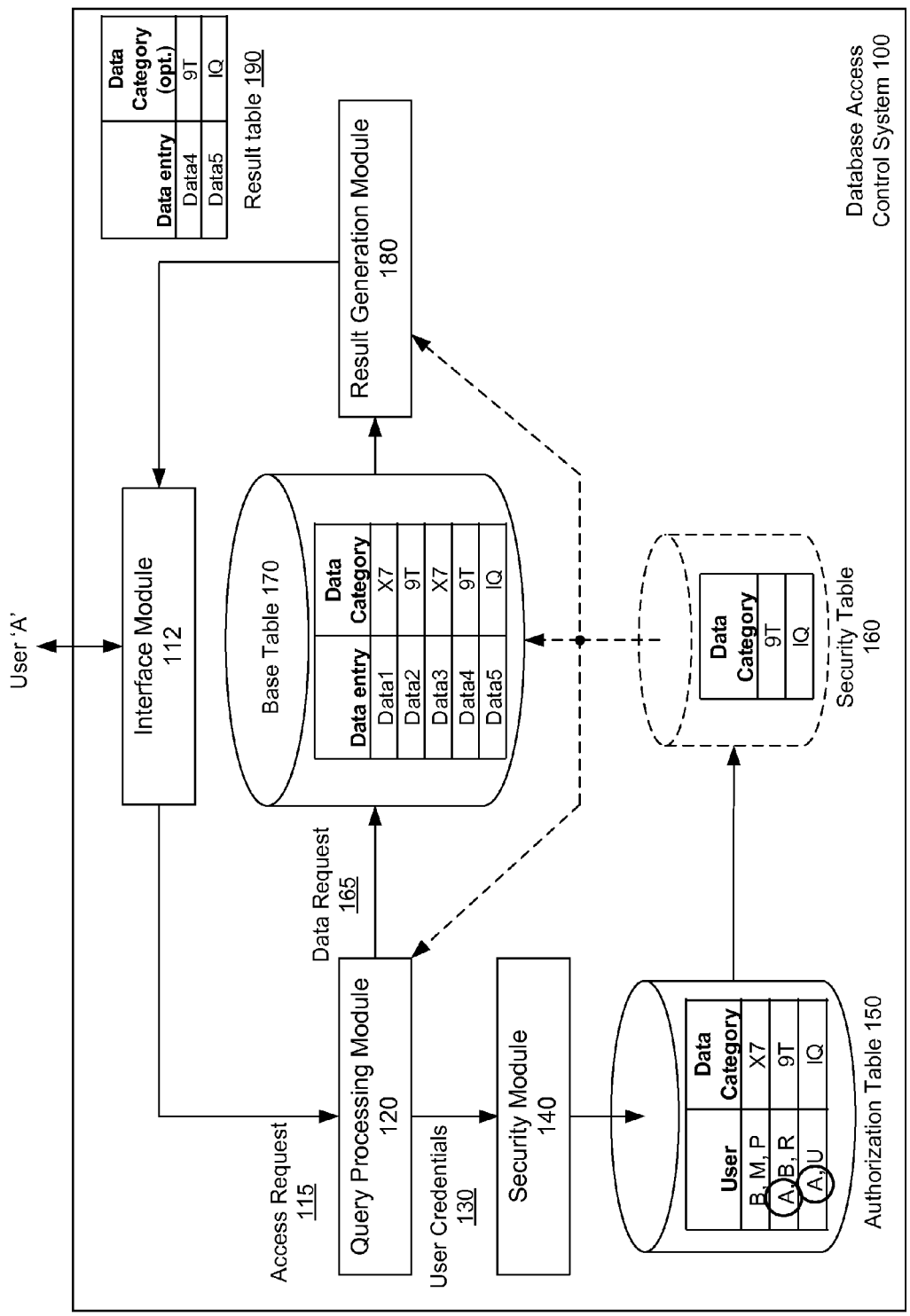
FIG. 2 illustrates an implementation for providing database access control, according to one embodiment.

FIG. 2 illustrates an implementation for providing database access control within the database access control system of FIG. 1, according to one embodiment. FIG. 2 illustrates an example database 100, including a query processing module 120, a security module 140, an authorization table 150, a base table 170, and a result generation module 180. In other embodiments, the database 100 includes additional, fewer, or different components.

A requesting user, User A in the example of FIG. 2, requests access to data stored in the base table 170 (access request 115) via an interface module 112. In some embodiments, the access request 115 includes user credentials 130 and the data request 165.

The user credentials 130 can include the identity of the requesting user (e.g., User A), a user password, or other user credentials. The data request 165 identifies one or more data entries stored in the base table 170 requested by User A. The access request 115 optionally includes additional information associated with the user or the context of the access request. For example, the access request can include the time of the request, the date of the request, the geographic location of the user, a security level of the user, a department or position of the user within an enterprise, and the like. Such information can be included in the access request 115 in metadata form. The access request 115 is optionally encrypted, tokenized, or otherwise protected.

The query processing module 120 receives the access request 115, and parses the access request 115 and provides the user credentials 130 to security module 140 and the data request 165 to query base table 170.

The security module 140 receives user credentials 130 and queries an authorization table 150 based on the user credentials 130. The authorization table 150 associates a user's credentials with data categories that the user can access. Stated differently, authorization table 150 stores one or more data categories, each data category associated with one or more users. For example, as shown in FIG. 2, the authorization table associates user B, user M, and user P with the data category X7; user A, user B, and user R with data category 9T; and user A and user U with data category IQ.

As illustrated in FIG. 2, in response to being queried by the security module 140, the authorization table 150 outputs the data categories with which the user is associated, for example in the form of a security table 160. In the example of FIG. 2, the authorization table 150 outputs data categories 9T and IQ (data categories associated in the authorization table 150 with requesting user A) as the security table 160. As described above, the security table 160 can be accessed by the query processing module 120, the base table 170, or the result generation module 180.

The query processing module 120 queries the base table 170 with the data request 165. Data entries are stored in base table 170, and each data entry is associated with a data category. For example, data entry "Data1" is associated with the data category "X7," data entry "Data2" is associated with the data category "9T," and so forth. The base table 170 retrieves the data entries identified in the received data request.

In embodiments where the query processing module 120 accesses the security table 160, the query processing module can remove from the data request data that is not associated with a data category in the security table, or can include the data categories identified in the security table within the data request 165. In some embodiments, the query processing module 120 queries the base table 170 with the data request 165, the base table 170 accesses the data categories identified in the security table 160 and outputs only the requested data associated with a category in the security table. Alternatively, the base table 170 can output all requested data entries to the result generation module 180, and the result generation module can access the security table 160 and can output only the data associated with a category identified by the security table.

For example, if User A requests data entries "Data2" and "Data3," and if the security table 160 identifies only data category "X7," then in embodiments where the base table 170 has access to the security table, the base table will output data entry "Data3" (associated with data category "X7"), but will not output data entry "Data2" (associated with data category "9T," which is not identified in the security table).

In one embodiment, as shown in FIG. 2, the base table 170 is organized into rows and columns, wherein each row includes a data entry (in a first column) and a data category associated with the data entry (in a second column). The columns and rows of the base table can be encrypted with various encryption algorithms and/or tokenized with various token tables.

In some embodiments, the result generation module 180 receives data entries and associated data categories from the base table 170, and transmits the received result data entries (e.g., as a result table 190) to User A. The result generation module 180 optionally formats the result table 190 for display to the requesting user. In an example, User A requests data entries "Data3," "Data4," and "Data5" stored in the base table 170. The security module 140 then determines that User A has access to data categories "9T" and "IQ." Accordingly, the base table 170 outputs all data entries associated with data categories "9T" and "IQ" identified by the data request ("Data4" and "Data5"). The result generation module 180 then outputs a result table 190 including data entries "Data4," and "Data5;" but not "Data3."

Figure 3A:
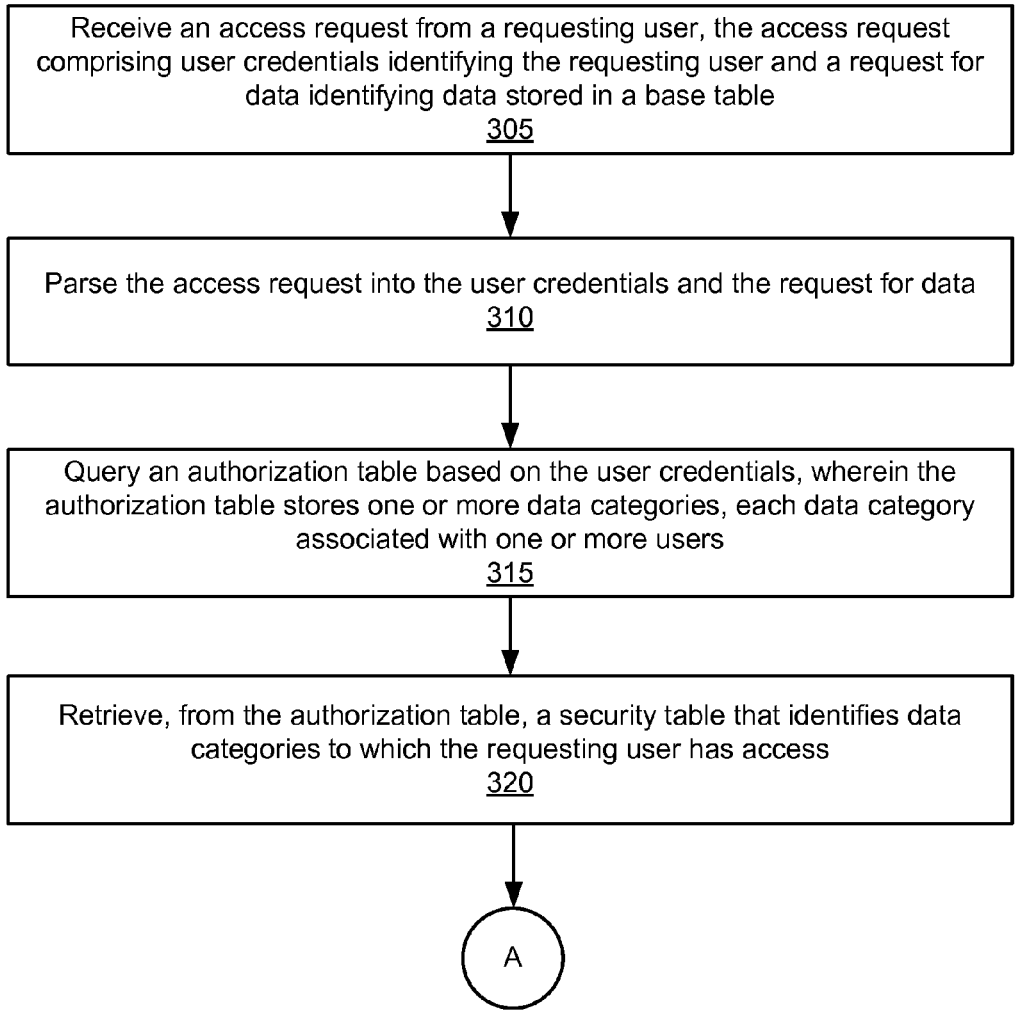
FIGS. 3A-3B include a flowchart illustrating a process for providing database access control, according to one embodiment.
Figure 3B:
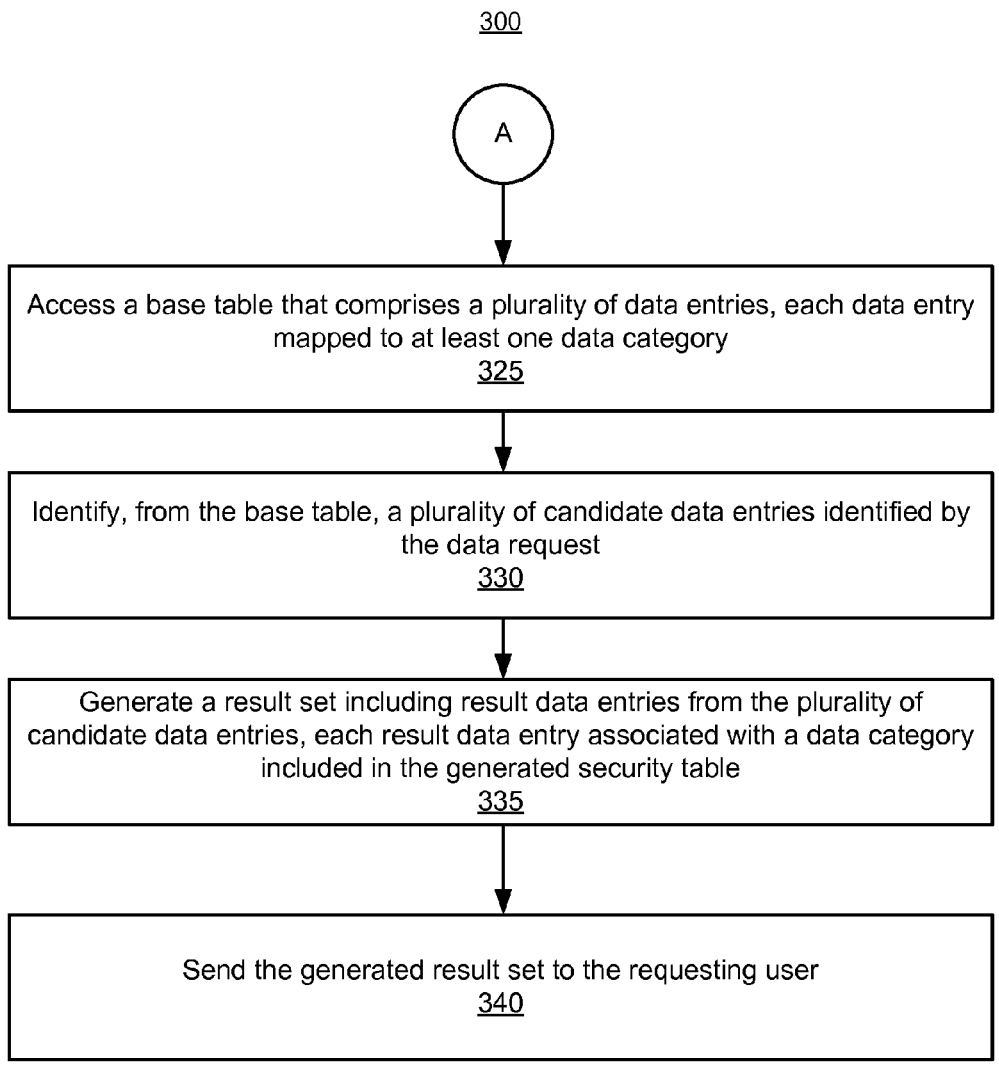

FIG. 3 is a flowchart that illustrates the process 300 for providing database access control, according to one embodiment. A database access system receives 305 an access request from a requesting user, the access request comprising user credentials identifying the requesting user and a request for data identifying data stored in a base table.

The database access system parses 310 the access request into the user credentials and the request for data. The database access system queries 315 an authorization table based on the user credentials. The authorization table stores one or more data categories, each data category associated with one or more users. The database control system retrieves 320, from the authorization table, a security table that identifies data categories to which the requesting user has access.

The database access system accesses 325 a base table that comprises a plurality of data entries, each data entry mapped to at least one data category. The database access system identifies 330, from the base table, a plurality of candidate data entries identified by the data request. The database access system generates 335 a result set including result data entries from the plurality of candidate data entries, each result data entry associated with a data category included in the generated security table.

In some embodiments, generating the result set includes performing a join operation between the generated security table and a table formed by the identified plurality of candidate data entries and their corresponding categories. In such embodiments, generating the result set further includes selecting the result data entries associated with data categories included in the generated security table or, alternatively, eliminating the result data entries associated with data categories not included in the generated security table. The database access system sends 340 the generated result set (e.g., in the form of a result table) to the requesting user.

Additional Configuration Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

It should be noted that various functionalities described herein may be combined in ways not explicitly described. Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may include a general-purpose computer selectively activated or reconfigured by a computer program stored on a non-transitory computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks include storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for database access control, comprising:
receiving an access request from a requesting user, the access request comprising user credentials identifying the requesting user and identifying requested data;
querying an authorization table with the user credentials, wherein the authorization table stores one or more data categories, each data category associated with one or more users that have access to data associated with the data category;
generating, based on the query of the authorization table, a security table that identifies a subset of the one or more data categories to which the requesting user has access, the security table different from the authorization table;
querying a base table that comprises a plurality of data entries with the identity of the requested data, each data entry mapped to at least one data category of the one or more data categories;
generating, based on the query of the base table, a candidate data entry table that includes data entries identified by the access request and the data categories to which each included data entry is mapped within the base table;
performing a join operation between the security table and the candidate data entry table to generate a result set, each result in the result set comprising a data entry within the candidate data entry table mapped to at least one data category included within the security table; and
providing the generated result set to the requesting user.

2. The method of claim 1, wherein at least one association between a data category and a user stored in the authorization table is determined based on a current time.

3. The method of claim 1, wherein an association between a particular data category and a corresponding user includes:
a data access level indicating a magnitude of data access to specific data entries provided to the corresponding user based on the particular data category.

4. The method of claim 3, wherein the data access level specifies a set of properties, of the specific data entries, to which the corresponding user has access based on the particular data category.

5. The method of claim 3, wherein the data access level specifies a nature of access rights, to the specific data entries, to which the corresponding user has access based on the particular data category.

6. The method of claim 3, wherein the data access level specifies a nature of encryption applied to the specific data entries, to which the corresponding user has access based on the particular data category.

7. The method of claim 3, wherein the data access level corresponding to the particular data category is determined based on a current time.

8. The method of claim 1, wherein:
the base table comprises an encrypted representation of the data entries and the data categories; and
querying the base table comprises decrypting one or more of the encrypted data entries to access the plurality of data entries and corresponding data categories.

9. The method of claim 1, wherein the one or more data categories stored in the authorization table correspond to business entities, organizational groups, class years, social circles, data types, data classes, security levels, or any combination thereof.

10. A method for database access control, comprising:
receiving an access request from a requesting user, the access request identifying one or more data entries stored in a base table, the base table comprising a plurality a data entries each associated with a data category;
generating a candidate data entry table by querying the base table with the identity of the identified data entries, the candidate data entry table including the identified data entries and, for each identified data entry, the data category to which the identified data entry is mapped within the base table;
generating a security table by querying, with an identity of the request user, an authorization table mapping each of a plurality of data categories to one or more users authorized to access the data category, the security table including one or more data categories to which the requesting user is authorized;
performing a join operation between the security table and the candidate data entry table to generate a result table, each result in the result table comprising a data entry mapped to a data category within the security table; and
outputting the result table.

11. A database access control system, comprising:
a non-transitory computer-readable memory storing executable computer instructions, the instructions comprising instructions for:
receiving an access request from a requesting user, the access request comprising user credentials identifying the requesting user and identifying requested data;
querying an authorization table with the user credentials, wherein the authorization table stores one or more data categories, each data category associated with one or more users that have access to data associated with the data category;
generating, based on the query of the authorization table, a security table that identifies a subset of the one or more data categories to which the requesting user has access, the security table different from the authorization table;
querying a base table that comprises a plurality of data entries with the identity of the requested data, each data entry mapped to at least one data category of the one or more data categories;
generating, based on the query of the base table, a candidate data entry table that includes data entries identified by the access request and the data categories to which each included data entry is mapped within the base table;
performing a join operation between the security table and the candidate data entry table to generate a result set, each result in the result set comprising a data entry within the candidate data entry table mapped to at least one data category included within the security table; and
providing the generated result set to the requesting user; and
a processor configured to execute the computer instructions.

12. The system of claim 11, wherein at least one association between a data category and a user stored in the authorization table is determined based on a current time.

13. The system of claim 11, wherein an association between a particular data category and a corresponding user includes:
a data access level indicating a magnitude of data access to specific data entries provided to the corresponding user based on the particular data category.

14. The system of claim 13, wherein the data access level specifies a set of properties, of the specific data entries, to which the corresponding user has access based on the particular data category.

15. The system of claim 13, wherein the data access level specifies a nature of access rights, to the specific data entries, to which the corresponding user has access based on the particular data category.

16. The system of claim 13, wherein the data access level specifies a nature of encryption applied to the specific data entries, to which the corresponding user has access based on the particular data category.

17. The system of claim 13, wherein the data access level corresponding to the particular data category is determined based on a current time.

* * * * *